United States Patent [19]

Wagner

[11] Patent Number: 5,010,131

[45] Date of Patent: Apr. 23, 1991

[54] BARRIER COATING

[75] Inventor: Steven D. Wagner, Loveland, Ohio

[73] Assignee: Texo Corporation, Cincinnati, Ohio

[21] Appl. No.: 424,426

[22] Filed: Oct. 20, 1989

[51] Int. Cl.$^5$ .............................................. C08K 3/18
[52] U.S. Cl. ..................................... 524/457; 524/524
[58] Field of Search ............................... 524/524, 457

[56] References Cited

U.S. PATENT DOCUMENTS 4,814,373 3/1989 Frankel et al. ...................... 524/457

Primary Examiner—Joseph L. Schofer
Assistant Examiner—Jeffrey T. Smith

[57] ABSTRACT

An aqueous solution is provided for forming a thermally releasable coating on paint spray booth surfaces and equipment located in paint spray booths such that the coating is easily removable with heated water. The solution comprises water, filler, film former, an alkaline source and a blowing agent. In one embodiment of the invention the solution also comprises buffer, corrosion inhibitor, dispersant, detackifier, thickener, and flow modifier. In another embodiment of the invention the solution also comprises corrosion inhibitor and detackifier. There is also disclosed a method for removing paint from a surface using the barrier coating of this invention.

12 Claims, No Drawings

BARRIER COATING

FIELD OF THE INVENTION

The present invention relates to a barrier coating and method of applying the same, and more specifically to a thermally releasable barrier coating having particular application in conjunction with paint spray booths.

BACKGROUND OF THE INVENTION

Paint spray booths are enclosures in which industrial production painting operations are performed. They are used by the automotive industry and by other manufacturers to spray automotive bodies and other products. Paint spray booths provide a clean environment for paint application, and separate the solvents from the solids in the paint.

In the process of spraying such articles, overspray tends to coat the interior surfaces of the booth with multiple layers of paint. Depending on the type of paint, this overspray could be tacky or relatively dry. In fact, in commercial paint spraying operations, frequently as much as 50% of the paint used is not deposited on the object to be painted.

The present practice is to remove accumulated overspray paint from the interior walls and surfaces of these booths through the use of solvent based strippers, either alone or coupled with scrubbing, or through the use of high pressured water blasting. In water blasting, a stream of water of up to 12,000 psi is sprayed at the paint, by a machine similar to the one disclosed in U.S. Pat. No. 4,218,155 issued to Goerss. The high pressure facilitates the removal of the paint. Under either the stripper or water blasting method, the paint is then deposited into water wash systems used to scrub the overspray particles from the exhaust air. For example, in the relatively newer type of paint spray booths, known as down draft booths, the air from the paint spray booths passes through steel grates in the floor into the wash water below, where the paint particles are detackified.

As a consequence of use, the interior surfaces of the paint spray booth including the steel grates, become covered with paint. This paint buildup can restrict the air flow from the booth, which in turn can cause air flow imbalances within the booth. Additionally, as the paint build ups, it creates a fire hazard due to its low flash point. Further, the buildup creates an occupational safety hazard as the floor becomes slippery and sticky.

Typically paint spray booths are cleaned daily. Under existing technology, it is not uncommon to find 6-10 men assigned to clean a 200 foot long permanently installed booth. Additionally, some facilities utilize small modular booths. Especially in the modular type of facility, due to space limitations, cleaning the grates is often accompanied by their being manually removed from the booth and manually cleaned elsewhere, although some permanently installed booths have their grates cleaned the same way. Since not all of these grates are the same size, a problem can arise at the time the grates are to be reinstalled in that one or more grates may be returned to an incorrect booth. Since some manufacturing facilities incorporate up to 20 or more booths, it can be appreciated that a large investment in man-hours and money is involved in the cleaning of paint spray booths.

An additional problem has been created in that many of the current paint products incorporate oligomers instead of the polymers commonly found in older paints, such that attempted removal of these paints is made more difficult, since they have a tendency towards tacky elasticity. For example, newer solvent borne paints will not cure at room temperature. These paints will remain sticky or tacky for long periods of time. Additional problems are created in that if the paint removed is flushed into the water wash, globs of non-detackified paint can clog the scrubber sections and transfer lines of the paint booth, sometimes resulting in the need to manually clean the system, which translates into downtime and additional labor costs for the entire system.

At one time a number of paint spray booths cleaners included methylene chloride strippers. However, this type of product suffers serious drawbacks in that the chemical methylene chloride is extremely undesirable, in that it is a possible carcinogen.

In the past, inert water-based-material or vinyl coatings have been used to precoat paint spray booths. An example of this is U.S. Pat. No. 4,548,967 issued to Brown, et al for a water soluble paint spray booth pre-coat comprising water, sugar, a plasticizer and polyvinyl pyrollidone. Another similar compound is disclosed in U.S. Pat. No. 4,748,049 issued to Charles, et al for a paint booth coating comprising an aqueous solution of polyvinyl alcohol, a foam depressor and a wetting agent. The above two organic paint spray booth coatings permit the paint overspray to be physically taken off by peeling or by a manual scraper. However, the polyvinyl pyrollidone and polyvinyl alcohol are extremely water sensitive, such that the performance of either of the above coatings is impaired at high relative humidity.

A further drawback of all of the aforementioned systems is that they are only capable of removing the paint associated with the upper portion of the grates, and as discussed above, the leftover paint can constitute a hazard. Additionally, the Brown et al and Charles et al coatings do not include specific teachings of their use on grates. A further problem encountered by the use of high pressure spraying is that if the wash water is too close to the grate, a back spray can be produced, thereby re-introducing tacky paint and undesirable chemicals back into the paint spray booth and back into the presence of the individuals assigned the task of cleaning the booth.

Recently a new organic based barrier coating has been developed which features the use of an organic blowing agent. The only known method for utilization of this coating has been via dipping, and it must be remembered that the formulation for a dippable barrier coating may not necessarily work in spray application form. This organic barrier coating releases a large amount of nitrogen when its temperature is raised to 195° F.

The use of a blowing agent in a barrier coating represents a radical departure from the prior art, since blowing agents are conventionally used in plastic molding operations. Their typical decomposition temperatures, at which temperatures they generate gases, are greater than 250° F., a temperature too high for use in paint spray booths given the low flash points of some solvents. Furthermore, the components of an organic based barrier coating with an organic blowing agent are relatively expensive and many water based organic coatings encounter drying time problems in booths with relatively high humidity.

With the exception of the single dippable organic based barrier coating discussed above, the approach of industry has been to improve the barrier coatings already in use and/or to utilize improved solvents as paint strippers. This is especially true with respect to sprayable barrier coatings. Unfortunately, the use of strippers poses an environmental, as well as a health-related, potential for danger.

It is thus apparent that the need exists for an improved barrier coating which provides for the safe and effective removal of paint overspray.

SUMMARY OF THE INVENTION

There is disclosed in accordance with this invention, an aqueous solution for forming a thermally releasable coating on paint spray booth surfaces and equipment located in paint spray booths, with the coating being easily removable with heated water, the solution comprising from about 10%-70% water, from about 5-50% filler, from about 2.5-20% film former, from about 1-15% alkaline source, and from about 5-50% blowing agent. More particularly, the aqueous solution comprises from about 20-50% water, from about 10-40% filler, from about 5-15% film former from about 2-10% alkaline source, and from about 10-40% blowing agent. The heated water applied to the paint spray booth and grate surfaces is of a temperature of at least 190° F.

Additionally, the filler may be comprised of a pigment. Preferably the pigment comprises an inorganic pigment and more preferably comprises calcium carbonate. Furthermore, the alkaline source results in the aqueous solution having a pH of greater than 8.0. The blowing agent is preferably an endothermal and self-nucleating blowing agent more preferably containing citric acid and sodium bicarbonate, and in the preferred of the embodiment is comprised of a compound known as HYDROCEROL TM BIH, a trademark of Boehringer Ingelheim. The film former associated with the invention is preferably a vinyl acetate copolymer emulsion. The aqueous solution also may include a detackifier, a corrosion inhibitor, and even a buffer.

There is also disclosed in this invention an aqueous solution for forming a thermally releasable barrier coating which is easily removable from a treated surface with heated water, with the aqueous solution comprising from about 20%-50% water, from about 10%-40% filler, from about 2%-15% film former, from about 2%-10% alkaline source, and from about 10%-40% blowing agent. In one embodiment of the invention, the barrier coating may be applied to the surface to be treated via dipping. A preferable composition for the aqueous solution for use in the dipping process comprises from 35%-45% water, from 10%-20% filler, from 2%-15% film former, from 1%-5% alkaline source, and from 15%-35% blowing agent. In this embodiment of the invention, the solution may also comprise from 1%-5% buffer, from 0.1%-1% corrosion inhibitor, from 0.05%-1% dispersant, from 1%-10% detackifier, from 0.1%-2% thickener, and from 0.5%-2% flow modifier.

In another embodiment of this invention, the barrier coating is applied to the surface to be treated via spraying. In this embodiment of the invention, the aqueous solution preferably comprises from 10%-30% water, from 20%-40% filler, from 5%-15% film former, from 1%-5% alkaline source, and from 20%-40% blowing agent. In this embodiment of the invention, the solution may also comprise from 0.1%-1% corrosion inhibitor and from 1%-10% detackifier.

There is also disclosed in this invention a method for removing paint from a surface comprising applying a barrier coating containing a blowing agent to the surface, allowing the barrier coating to dry sufficiently so as to form a thermally removable barrier coating which is subsequently covered with paint, and, when removal of the paint is desired, applying hot water of a temperature of at least about 190° F. to the paint covered barrier coating. The method also may include the step of activating the blowing agent, such that the paint detaches from the surface.

There is also disclosed in this invention an aqueous solution for forming a thermally releasable barrier coating which is easily removable from a treated surface by means of heated water, with the solution comprising water, filler, a film former, an alkaline source, and a blowing agent.

The primary object of this invention is to provide a barrier coating which is easily removable from treated surfaces such as paint spray booth walls and grates.

Another important object of this invention is to provide a releasable barrier coating which does not contain potentially dangerous chemicals such as methylene chloride.

Yet another objective of this invention is to provide a barrier coating which can be easily applied as well as easily removed, using a relatively minimal amount of man-hours.

These and other objects and advantages of the invention will be readily apparent from the following description, and the appended claims.

DETAILED DESCRIPTION OF THE INVENTION

The present invention is concerned with a barrier coating and method of applying the same having particular application in conjunction with paint spray booths. The barrier coating disclosed by this invention comprises water, a filler, a film former, an alkaline source, and a blowing agent. Preferably the solution comprises from about 20%-50% water, from about 10%-40% filler, from about 5%-15% film former, from about 1%-10% alkaline source, and from about 10%-40% blowing agent.

The filler is preferably a pigment. For example, the barrier coating formed as a result of this invention preferably includes a pigment comprised of an organic, or an inorganic such as calcium carbonate, such that a viscous liquid is produced. The film former assists in preserving the integrity of the barrier coating through its resistance to water. Additionally, the film former assists in maintaining material flow as the coating is applied. It has been found that vinyl acetate copolymer emulsions are particularly effective as a film former associated with this particular barrier coating, and more particularly, an emulsion known as FLEXBOND ® 325, a trademark of Air Products and Chemicals, Inc., has been found to be desirable. Other possible substitutions for a vinyl acetate copolymer emulsion, depending on part on the type of paint and the conditions surrounding application, include sugar, soap, some organic salts and polyvinyl alcohol.

Due to the existence of an organic barrier coating having an organic blowing agent incorporated therein, and the problems associated therewith, attempts were made to incorporate a blowing agent into the predominantly inorganic based barrier coating of this invention. As stated above, conventional blowing agents decompose at temperatures greater than 250° F. In the relatively neutral pH initially associated with the barrier coating of this invention, none of the conventionally available blowing agents worked at desirable temperatures, i.e. approximately 190° F.

After relatively extensive research, an endothermal blowing agent known as HYDROCEROL TM BIH, a trademark of Boehringer Ingelheim, was found to produce acceptable results. HYDROCEROL TM BIH is a fine white powder comprising a mixture of finely ground citric acid and sodium bicarbonate. It is believed that either one or both of the mixture's particles of citric acid and sodium bicarbonate are coated with polyethylene. The normal application of HYDROCEROL TM BIH is in formed plastic manufacture to lower the density of the plastic by inclusion therein of carbon dioxide gas. The carbon dioxide gas is formed in the plastic manufacture when the citric acid melts and reacts with the sodium bicarbonate, with this reaction occurring at approximately 320° F.

Unexpectedly it was found that in alkaline water the HYDROCEROL TM BIH behaved quite differently. While at room temperature the HYDROCEROL TM BIH can be suspended in an alkaline solution without liberation of carbon dioxide, increasing the water temperature to 160° F. results in the slow release of carbon dioxide gas. At temperatures between 190° F. and 200° F. the evolution of carbon dioxide gas reaches a maximum. There may well be other blowing agents which exhibit similar results in an alkaline environment at acceptable temperatures.

The alkaline source for the barrier coating of this invention in the preferred embodiment is caustic soda liquid (50%) having an initial sodium hydroxide pH of greater than 10. Upon mixing of the ingredients found in the preferred embodiment of the barrier coating, the final pH is greater than 8 and in the preferred embodiment preferably ranges between 8 and 9.

Thermally releasable barrier coatings may be applied via dipping or spraying. A plant that utilizes the dippable type of grate cleaning operation typically has two sets of grates for each paint booth. A clean set of grates has the thermal release coating of this invention applied by dipping. The coating is then allowed to dry, usually by force drying at 120°-140° F., before the coated grates are placed back into the paint booth.

When the coated grates have accumulated paint overspray during production, they are subsequently removed from the paint booth for cleaning. The paint coated grates are then replaced with a second set of clean grates. The grates coated with paint overspray are then dipped into hot water of a temperature of at least approximately 190° F. The barrier coating releases from the grate as carbon dioxide is generated and the paint overspray is carried away with the coating residue. The result is a grate which is free from coatings and paint overspray. The clean grate is then dipped in the thermal release coating and the process renews.

Depending on the method of applying the coating, it has been discovered that slightly different formulae are desirable for optimum performance. For example, the dippable thermally releasable barrier coating as disclosed by this invention, it has been found desirable to also include a dispersant, such as MARASPERSE TM N-22, a trademark of Daishowa Chemicals, Inc. It has also been found desirable to include a corrosion inhibitor, preferably sodium nitrite which prevents corrosion on steel. It has also been found desirable to incorporate a paint detackifier, preferably a melamine formaldehyde condensate, to assist in detackification of the paint overspray such that contacts the coating. Consequently, the barrier coating exhibits no detrimental impact on detackification programs or waste treatment facilities. It has also been found desirable to incorporate an alkaline buffer, preferably triethanolamine (99%), as well as a thickener, such as NATRASOL TM 250 HR, a trademark of Hercules, Inc. It has also been found desirable to incorporate a flow modifier, such as CARBOSET TM 514H resin, a trademark of B. F. Goodrich Co.

While the basic ingredients for the thermal release coating disclosed by this invention are water, a film former, an alkaline source, a filler such as pigment, and a blowing agent, tests conducted with this particular barrier coating have indicated the best mode for application via dipping is set forth below, particularly in Example 7. The preferred formulation for use in dippable applications comprises from 35%–45% water, from 10%–20% filler, from 2%–15% film former, from 1%–5% alkaline source, and from 15%–35% blowing agent. More preferably the solution also comprises from 1%–5% buffer, from 0.1%–1% corrosion inhibitor, from 0.05%–1% dispersant, from 1%–10% detackifier, from 0.1%–2% thickener, and from 0.5%–2% flow modifier.

The barrier coating may also be applied to paint spray booths surfaces and equipment located in paint spray booths via spraying. In this particular embodiment of the method, the grates are cleaned and coated while in place in the paint spray booth at the same time when the walls are cleaned and coated. The thermally releasable barrier coating of this invention is applied by spraying through a pump having the ratio of exit pressure versus entrance pressure from between 25:1 to 30:1. The coating is allowed to dry before paint operations begin, just as is the case in dip process.

Once again, paint overspray accumulates such that the grates require cleaning. The grates are cleaned by the application of hot water having a temperature at least approximately 190° F. The cleaning may be accomplished with water flow at a relatively low pressure of 50–100 psi, and at a volume of 25–50 gallons per minute. Once again, when the temperature of the coating is increased, the blowing agent is activated such that the thermally releasable barrier coating generates carbon dioxide. The generation of the carbon dioxide causes the barrier coating and the paint overspray to detach from the surface so that they are quickly and easily removed from the grate. The same cleaning process also occurs with respect to the walls of the paint spray booth, resulting in a paint spray booth and grate free of coating and paint overspray.

The coating may be reapplied by spraying, allowed to dry, such that the process renews. The drying time for the sprayable formulation of what is believed to be the best mode as is set forth below in Example 2 is approximately ½–1 hour depending upon the temperature and the relative humidity in the paint spray booth. Adequate drying occurs in one hour where the temperature is 72° F. and the relative humidity is 75–80%. When dry, the barrier coating as prepared in the preferred embodiments, with calcium carbonate as a pigment, imparts a brilliant white coating to the paint spray booth which brightens the appearance of the booth significantly.

With respect to this embodiment of the invention, in addition to the water, filler such as inorganic pigment, film former, alkaline source, and blowing agent which preferably are the same as in the dippable formula, the sprayable formulation also preferably includes a corrosion inhibitor and a paint detackifier, sodium nitrite and melamine formaldehyde condensate, respectively. The preferred formulation for use in sprayable applications comprises from 10%–30% water, from 20%–40% filler, from 5%–15% film former, from 1%–5% alkaline source, and from 20%–40% blowing agent. More preferably the solution also comprises from 0.1%–1% corrosion inhibitor and from 1%–10% detackifier.

Both formulations, both the dippable and sprayable embodiments, are non-dusting. In actual use, approximately one square foot of grate can be covered with approximately 0.5 pounds of the barrier coating disclosed by this invention, which poundage is roughly equivalent to 0.038 gallons.

The thermally releasable barrier coating of this invention in addition to primary application in conjunction with paint spray booths, also provides other applications for removing objects other than paint overspray from a treated surface. For example, the thermally releasable barrier coating has potential application for use in conjunction with paint masks for plastic auto parts, where it is desirable for only one side of the part to be painted. Another potential application is in the paper industry for use in blowing off fiber wastes from grates or other surfaces. Yet another unique application for the thermally releasable barrier coating of this invention is in connection with the sanitation industry, wherein the barrier coating could be sprayed onto the interior surfaces of sanitation vehicles, such that upon subsequent spraying with heated water, the waste residue could quickly and easily be removed.

The invention will be better understood in view of the following examples, which are illustrative only and should not be construed as limiting the invention. While these examples deal primarily with the use of coatings of this invention in paint spray booths, it should be pointed out that the coatings have greater applications including surface protection from oils, etc. and metal machining operations, the protection of painted parts during shipment, and many other applications where it would be desirable to protect a surface from contact with a hydrocarbon base material. In each of the examples the filler is comprised on an inorganic pigment, such as calcium carbonate.

EXAMPLE 1

In this example, the particular composition used had the following composition:

| Water | 38.38 |
|---|---|
| Inorganic Pigment | 51.32 |
| Soap | 9.05 |
| Water Softener | 0.65 |
| Defoamer | 0.20 |
| Thickener | 0.40 |

The composition was made in accordance with well known principles in the art of chemical compounding. It could be applied to the grate either by dipping or spraying using the procedure and under the conditions discussed above with respect to the dipping and spraying applications associated with the barrier coating of the instant invention. Regardless of the specific method of application, removal of the paint had to be effected by reliance on prior art methods, specifically through the use of high pressure water, i.e. 1,000–12,000 psi.

Under conditions where high pressure water removal could be utilized, the barrier coating which is similar to those known to exist in the prior art, was effective. However, if the barrier coating of Example 1 had been used with some modern paints or with water based paints, it is known that the performance of the barrier coating would have been impaired. Additionally, it must be remembered that the use of high pressure water is inappropriate in paint spray booths where the circulating water associated with the water wash system is too close to the floor.

EXAMPLE 2

In this example, the particular composition used had the following composition:

| Water | 20 |
|---|---|
| HYDROCEROL TM BIH | 30.05 |
| Calcium Carbonate | 30.05 |
| FLEXBOND ® 325 | 12.9 |
| Caustic Soda Liquid (50%) | 2.5 |
| Melamine Formaldehyde Condensate | 4.3 |
| Sodium Nitrite | .2 |

The coating of this composition was also made in accordance with known principles of the art of chemical compounding, but with the pH of the composition controlled during the addition of the HYDRCEROL TM BIH, such that the pH of the composition during the addition was greater than 8.5.

The coating was sprayed through a 25:1 to 30:1 pump onto clean grates in a paint spray booth where the temperature was 72° F. and the relative humidity was 80%. The coating was allowed to dry before painting began. During painting, paint overspray accumulated on the coating. For cleaning, the grates had hot water of 190° F. applied thereto at a relatively low pressure (50–100 psi) and at a low volume (i.e. 25–50 gallons per minute). Removal was quick and the paint was completely removed from the grates.

EXAMPLE 3

In this example, the particular composition used had the following composition:

| Water | 22.5 |
|---|---|
| HYDROCEROL TM BIH | 30.05 |
| Calcium Carbonate | 30.05 |
| FLEXBOND ® 325 | 12.9 |
| Melamine Formaldehyde Condensate | 4.3 |
| Sodium Nitrite | .2 |

This particular composition was made using the principles utilized in Example 1. It should also be noted that in this particular example, no alkaline source was present. The coating was sprayed through a 25:1 to 30:1 pump onto clean grates in a paint spray booth where the temperature was 72° F. and the relative humidity was 80%. The coating was allowed to dry before painting began. During panting, paint overspray accumulated on the coating. For cleaning, the grates had hot water of 190° F. applied thereto at a relatively low pressure (50–100 psi) and at a low volume (i.e. 25–50 gallons per minute).

Due to the absence of an alkaline source, during the chemical compounding of this particular composition there was a rapid evolution of carbon dioxide. This rapid evolution destroyed the effectiveness of the blowing agent. Thus, when the grate was sprayed with hot water, the barrier coating did not have the blowing agent activated. Consequently, it was necessary to utilize prior art methods of removal, such as high pressure water or solvents, in order to effect the removal of the paint from the grate.

EXAMPLE 4

In this example the particular composition used had the following composition:

| Water | 20.05 |
|---|---|
| Calcium Carbonate | 60.05 |
| FLEXBOND ® 325 | 12.9 |
| Caustic Soda Liquid (50%) | 2.5 |
| Melamine Formaldehyde Condensate | 4.3 |
| Sodium Nitrite | .2 |

The particular composition of Example 4 was made in accordance with known principles in the art of chemical compounding. The composition of Example 4 was similar to that of Example 2, however, no blowing agent was present. The coating was sprayed through a 25:1 to 30:1 pump onto clean grates in a paint spray booth where the temperature was 72° F. and the relative humidity was 80%. The coating was allowed to dry before painting began. During painting, paint overspray accumulated on the coating. For cleaning, the grates had hot water of 190° F. applied thereto at a relatively low pressure (50–100 psi) and at a low volume (i.e. 25–50 gallons per minute).

The effectiveness was similar to Example 3. The absence of any blowing agent prevented the barrier coating from being thermally releasable. As was the case with Example 3, the barrier coating made in accordance with Example 4 had to be removed by prior art methods such as high pressure water.

EXAMPLE 5

In this example the particular composition used had the following composition:

| Water | 42.9 |
|---|---|
| Calcium Carbonate | 30.05 |
| HYDROCEROL ™ BIH | 30.05 |
| Caustic Soda Liquid (50%) | 2.5 |
| Melamine Formaldehyde Condensate | 4.3 |
| Sodium Nitrite | .2 |

Although it was made almost the same as Example 2, no film former was present. The coating was sprayed through a 25:1 to 30:1 pump onto clean grates in a paint spray booth where the temperature was 72° F. and the relative humidity was 80%. The coating was allowed to dry before painting began. During painting, paint overspray accumulated on the coating. For cleaning, the grates had hot water of 190° F. applied thereto at a relatively low pressure (50–100 psi) and at a low volume (i.e. 25–50 gallons per minute).

When sprayed with hot water the paint detached wherever there was sufficient barrier coating underneath to effect such detachment. In the absence of film former, prior to being coated with paint overspray the composition had a tendency towards dusting, which created the undesirable side effects of tracking and airborne particulate matter. Furthermore, an even distribution of the coating was prevented thereby adversely comprising the effectiveness of this embodiment of a thermally releasable barrier coating.

EXAMPLE 6

In this example the composition and procedure of Example 2 was followed, except that the temperature of the water applied thereto was 90° F. while the pressure and volume were the same as in Example 2. The coating was allowed to dry before painting began. During painting, paint overspray accumulated on the coating. For cleaning, the grates had water of 90° F. applied thereto at a relatively low pressure (50–100 psi) and at a low volume (i.e. 25–50 gallons per minute). Due to the temperature of the water being applied to the accumulated paint overspray, the blowing agent was not activated and the coating along with the paint was not released. Removal had to be effected through the prior art methods, such as high pressure water and solvents.

EXAMPLE 7

In this example the particular composition used had the following composition:

| Water | 41.8 |
|---|---|
| HYDROCEROL ™ BIH | 26.0 |
| Calcium Carbonate | 15.0 |
| FLEXBOND ® 325 | 5.0 |
| Caustic Soda Liquid (50%) | 2.0 |
| Triethanolamine (99%) | 3.5 |
| CARBOSET ™ 514 H | 1.0 |
| NATRASOL ™ 250 HR | 0.4 |
| MARASPERSE ™ N-22 | 0.1 |
| Melamine Formaldehyde Condensate | 5.0 |
| Sodium Nitrite | 0.2 |

The coating was applied to the paint spray booth grates by dipping the grates therein. The coating was force dried at 120°–140° F. The grates were placed back into the paint booth. During painting, paint overspray accumulated on the coating. For cleaning, the grates with paint overspray and barrier coating were removed and then placed into hot water of at least a temperature about 190° F. for 3–5 minutes. The coating released from the grate, carrying the paint overspray with it. The result was a grate which was free from coatings and paint overspray.

While the form of apparatus and method herein described constitutes a preferred embodiment of this invention, it is to be understood that the invention is not limited to this precise form of apparatus or method, and that changes may be made therein without departing from the scope of the invention which is defined in the appended claims.

What is claimed is:

1. An aqueous solution for forming a thermally releasable coating on spray booth surfaces and equipment located in paint spray booths, said coating being easily removable with heated water, said solution comprising,
   from about 20%–50% water,
   from about 10%–40% filler, said filler being a pigment,
   from about 5%–15% film former selected from the group consisting of vinyl acetate copolymer emulsions, sugar, soap, organic salts and polyvinyl alcohol, from about 1%–10% alkaline source, selected such that said aqueous solution has a pH of greater than 8.0, and from about 10%–40% blowing agent, said blowing agent comprising citric acid and sodium bicarbonate.

2. The aqueous solution as claimed in claim 1 wherein said heated water is of a temperature of at least about 190° F.

3. The aqueous solution as claimed in claim 1 wherein said pigment comprises an inorganic pigment.

4. The aqueous solution as claimed in claim 1 wherein said blowing agent is an endothermal and self-nucleating blowing agent.

5. The aqueous solution as claimed in claim 1 which includes a detackifier and a corrosion inhibitor.

6. The aqueous solution as claimed in claim 5 which includes a buffer.

7. An aqueous solution for forming a thermally releasable barrier coating, said barrier coating being easily removable from a treated surface with heated water, said solution comprising, from about 20%–50% water, from about 10%–40% filler, said filler being a pigment, from about 2%–15% film former, selected from the group consisting of vinyl acetate copolymer emulsions, sugar, soap, organic salts, and polyvinyl alcohol, from about 1%–10% alkaline source, selected such that said aqueous solution has a pH of greater than 8.0, and from about 10%–40% blowing agent, said blowing agent comprising citric acid and sodium bicarbonate.

8. The aqueous solution as claimed in claim 7 wherein said solution comprises from 35%–45% water, from 10%–20% filler, from 2%–15% film former, from 1%–5% alkaline source, and from 15%–35% blowing agent.

9. The aqueous solution as claimed in claim 8 wherein said solution comprises from 1%–5% buffer, from 0.1%–1% corrosion inhibitor, from 0.05%–1% dispersant, from 1%–10% detackifier, from 0.1%–2% thickener, and from 0.5%–2% flow modifier.

10. An aqueous solution for forming a thermally releasable barrier coating, said barrier coating being easily removable from a treated surface with heated water, said solution comprising, from 10%–30% water, from 20%–40% filler, said filler being a pigment, from 5%–15% film former, selected from the group consisting of vinyl acetate copolymer emulsions, sugar, soap, organic salts, and polyvinyl alcohol, from 1%–5% alkaline source, selected such that said aqueous solution has a pH greater than 8.0, and from about 20%–40% blowing agent, said blowing agent comprising citric acid and sodium bicarbonate.

11. The aqueous solution as claimed in claim 10 wherein said solution comprises from 0.1%–1% corrosion inhibitor, and from 1%–10% detackifier.

12. An aqueous solution for forming a thermally releasable barrier coating, said barrier coating being easily removable from a treated surface with heated water, said solution comprising, from 10%–70% water, from about 5%–50% filler being a pigment, from about 2.5%–20% film former selected from the group consisting of vinyl acetate copolymer emulsions, sugar, soap, organic salts, and polyvinyl alcohol, from about 1%–15% alkaline source, selected such that said aqueous solution has a pH of greater than 8.0, and from about 5%–50% blowing agent, said blowing agent comprising citric acid and sodium bicarbonate.

* * * * *